United States Patent [19]

Mullersman

[11] Patent Number: 4,490,667
[45] Date of Patent: Dec. 25, 1984

[54] SYSTEM AND CIRCUIT FOR CHARGING A RECHARGEABLE BATTERY

[75] Inventor: Ferdinand H. Mullersman, Gainesville, Fla.

[73] Assignee: General Electric Company, Gainesville, Fla.

[21] Appl. No.: 413,583

[22] Filed: Aug. 31, 1982

[51] Int. Cl.³ .............................................. H02J 7/04
[52] U.S. Cl. ..................................................... 320/48
[58] Field of Search ..................................... 320/4, 48

[56] References Cited

U.S. PATENT DOCUMENTS

| | | |
|---|---|---|
| 3,391,321 | 7/1968 | Ota . |
| 3,421,142 | 1/1969 | Vircher . |
| 3,579,075 | 5/1971 | Floyd . |
| 3,681,673 | 8/1972 | Weinstock . |
| 3,746,961 | 7/1973 | Doble . |
| 3,866,105 | 2/1975 | Heine et al. ........................... 320/48 |
| 4,006,396 | 2/1977 | Bogut . |
| 4,020,414 | 4/1977 | Paredes .............................. 320/48 X |
| 4,109,193 | 8/1978 | Schultheis . |
| 4,147,969 | 4/1979 | Miller et al. ...................... 320/48 X |

*Primary Examiner*—William M. Shoop
*Attorney, Agent, or Firm*—Henry J. Policinski

[57] ABSTRACT

A system and circuit for charging a rechargeable battery from an external source of direct current is provided wherein the circuit includes an indicator for indicating the passage of charge current through the circuit. The circuit precludes the indicator from providing a false indication of the passage of charging current.

6 Claims, 4 Drawing Figures

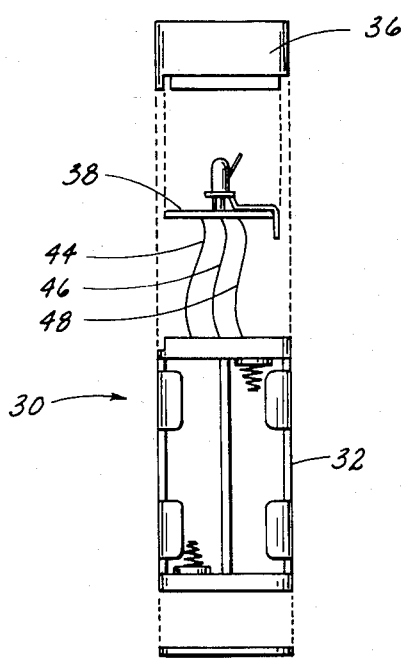
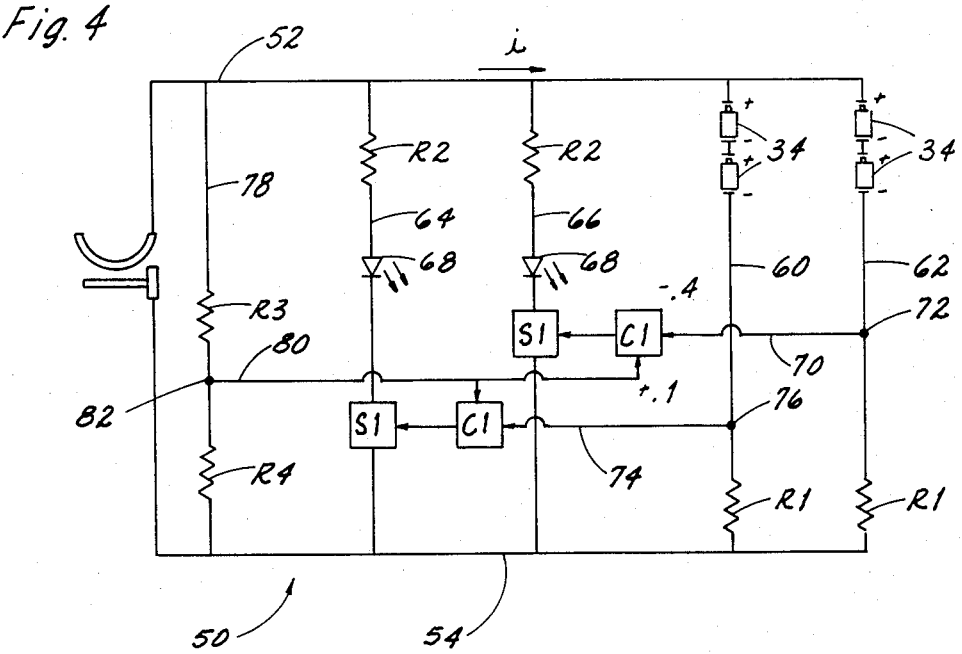

SYSTEM AND CIRCUIT FOR CHARGING A RECHARGEABLE BATTERY

BACKGROUND OF THE INVENTION

This application relates to a system for charging rechargeable batteries and to an electrical circuit useful in charging rechargeable batteries.

There are many consumer products sold on the market today which are intended for portable use and hence are intended to be primarily powered by electrochemical cells or batteries. Portable radios, calculators, cassette tape recorders, video cameras are but a few examples of these products. Many of these products, while they are intended primarily for portable use and hence are designed to operate from a low voltage direct current source, such as an electrochemical cell or battery, have a need to operate from a source powered from conventional household alternating current. To satisfy this need, typically the product is sold with a separate AC to DC converter which may be interposed electrically between the source of AC power and the product to convert the alternating current to direct current and to reduce the high voltage to a lower voltage compatible with the design of the product.

Historically, many consumer products have been powered by primary or non-rechargeable cells or batteries. In the rather recent past, however, secondary or rechargeable batteries have proved to be particularly suitable for providing power to consumer products. Rechargeable cells or batteries, however, must be recharged when the electrical energy stored in the cell or battery has been expended. In the rather recent past, however, secondary or rechargeable batteries have proved to be particularly suitable for providing power to consumer products. Rechargeable cells or batteries, however, must be recharged when the electrical energy stored in the cell or battery has been expended. Since consumer products of the type described above do not contain any means for recharging the secondary battery, the user must purchase a charging device to accomplish that purpose. The present invention is directed toward a device which will permit the user of the consumer product to utilize the AC to DC converter, sold with the product, as a means for charging secondary batteries.

It is in the art to provide a visual indication that charge current is properly being delivered to the cells or batteries. One problem particularly addressed by the present invention, is that associated with the low voltage delivered by the AC to DC converter. The consumer product is typically designed to operate at the relatively low voltage available from the cells or batteries providing power during portable use. Accordingly then, the AC to DC converter must provide the same relatively low output voltage provided by the cells or batteries during portable use. In many instances, the low voltage provided by the AC to DC converter is not sufficient to contemporaneously provide an acceptable voltage for charging the batteries and sufficient voltage for providing the aforementioned visual indication. The present invention addresses this problem.

Another problem addressed by the present invention is associated with the fact that it is common to charge a plurality of cells or batteries or sets of cells or batteries contemporaneously in the same charging unit. It is possible that the cells or batteries will not be at the same state of discharge. When the sets are connected in a parallel circuit, but not receiving current from the AC to DC converter, current will none-the-less flow from the cells or batteries at the higher state of discharge to the cells or batteries at the lower state of discharge. This flow of current between the cells or batteries connected in parallel, while not detrimental, may cause the indicator mentioned above to provide a false indication that charge current is being supplied to the cells or batteries from the AC to DC converter. The user then will be mislead into believing that charging current is being delivered to the cells when in fact it is not. The present invention addresses this problem.

SUMMARY OF THE INVENTION

Therefore, it is an object of the present invention to provide a charging system and a charging circuit for charging a rechargeable cell or battery.

It is another object of the present invention to provide a charging circuit adapted to receive charge current from an AC to DC converter otherwise providing direct current to a current using device.

It is still another object of the present invention to provide a charging circuit adapted to provide a charging circuit useable with an AC to DC converter delivering an output voltage insufficient, when connected to a cell in series with a charge current indicator, to contemporaneously charge cells and provide a visual indication that charging current is being delivered.

It is yet another object of the present invention to provide a charging system having means for visually indicating that charge current is being delivered to the cells.

It is still another object of the present invention to provide a charging system having means for preventing a false indication of charge current delivery when cells are not receiving charging current from the AC to DC converter.

These and other objects, which will become apparent from a reading of the following specification with reference to the appended drawings, are accomplished by the present invention which, briefly stated and in one form, provides an electrical circuit for recharging a rechargeable cell comprising current input means adapted to be connected to a source of direct current, a first current branch adapted to receive a rechargeable cell or battery and a second current branch disposed in said circuit in parallel with the first current branch. The second current branch includes indicator means for indicating the passage of a first predetermined level of charge current through the first current branch. Means are provided for preventing the passage of current through said second current branch when the current in the first current branch is below the predetermined level. The preventing means may be comprised of comparator means for comparing a first parameter in the first current branch with a reference parameter and switch means disposed in said second current branch and operative in a first mode to prevent the passage of current through said second current branch and operative in a second mode to permit the passage of current through said second current branch. The preventing means may be comprised of switch means and voltage comparator means, the latter providing a signal in response to a predetermined voltage between a reference voltage and a voltage in the first current branch, the former receiving the signal to permit the passage of current through the second branch. In another form of the invention, a circuit is provided for charging a plurality of sets of cells simultaneously in parallel charging branches. In this embodiment, the charge indicators are precluded from providing a false indication of charge in a manner hereinafter to be explained.

DESCRIPTION OF THE DRAWINGS

For a better understanding of the present invention together with additional objects, advantages and features thereof, reference is made to the following description of the preferred embodiment along with the accompanying drawings in which:

FIG. 3 depicts an exploded side view of the module depicted in FIG. 2.

FIG. 4 depicts a schematic circuit diagram of the present invention.

DESCRIPTION OF THE PREFERRED EMBODIMENT

Figure 1:
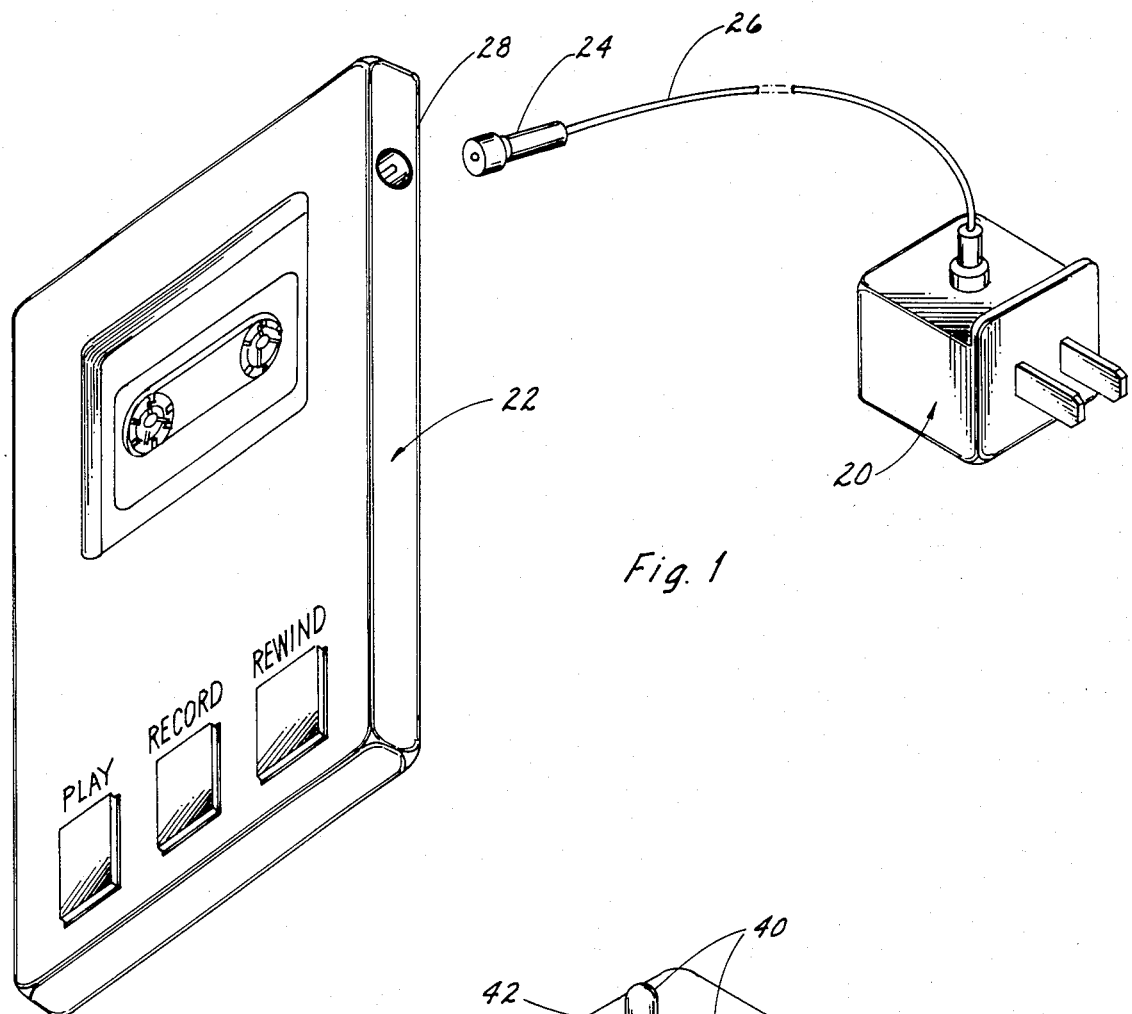
FIG. 1 depicts apparatus known in the art.

Referring now to FIG. 1, a system for operating a current using device is depicted. This system, known in the prior art, is comprised of means for converting alternating electrical current into direct electrical current, shown in the form of AC to DC converter 20, and a current using device in the form of cassette tape recorder 22. Recorder 22 is portable and adapted to be powered primarily by electrochemical cells or batteries available in this art. During times when the user desires to operate recorder 22 from household current, recorder 22 may be connected to converter 20 by inserting plug 24 line 26 into the socket 28 in recorder 22. With converter 20 inserted into a wall socket, recorder 22 may receive direct current at any appropriate voltage and amperage from converter 20.

With the system depicted in FIG. 1, a user of device 22 who desires to use rechargeable electrochemical cells or batteries is left with no system means by which the rechargeable cells or batteries may be charged. To accomplish charging, the user must purchase a charging unit including a transformer component comprising part of the charging unit. The present invention provides means by which part of the system depicted in FIG. 1 may be used to charge rechargeable batteries. More specifically, the present invention provides a charging module adapted to be connected to converter 20 to accomplish charging of rechargeable batteries. With the present invention, the user need not purchase an additional transformer component, especially for charging.

Figure 2:
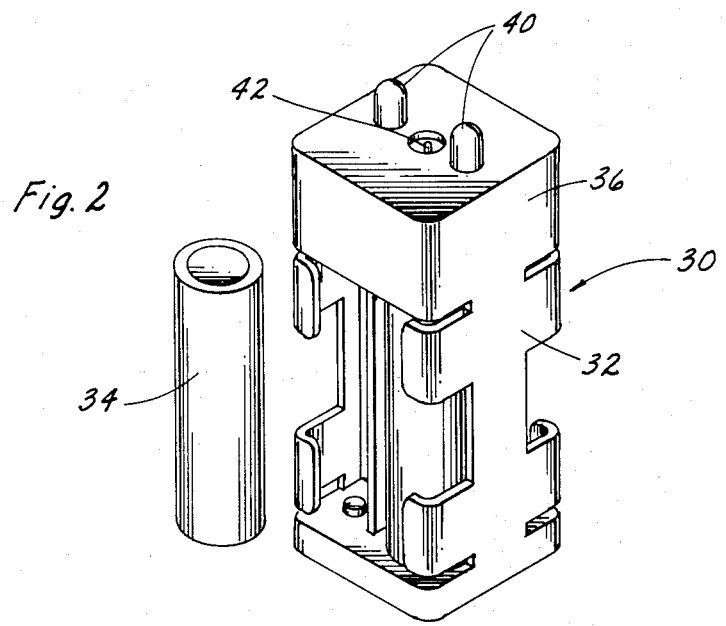
FIG. 2 depicts a perspective view of the charging module comprising the present invention.

Referring now to FIGS. 2 and 3, a charging module 30 is depicted in perspective and exploded views. Module 30 is comprised of a base position 32 adapted to receive and retain a plurality of rechargeable cells or batteries 34 in a position for charging and an upper position 36 adapted to house an electrical circuit board 38 containing an electrical circuit for effecting and controlling charging of the cells 34. Base position 32 depicted in FIGS. 2 and 3 is of the same construction as the cell holder module depicted and described in my U.S. Pat. No. 4,009,429, issued Feb. 22, 1977 and accordingly the cells 34 are held and retained in base position 32 in the same manner as cells are retained in the cell holder module depicted in the aforementioned patent. It should be understood however that the present invention is equally applicable to cell holder modules of other construction in order to accomodate recharging of cells of a different size or a different quantity.

Module 32 is adapted to hold and retain simultaneously four cells. Two separate parallel current branches are provided and each branch is adopted to receive two of the four cells in series. Indicator means 40 are associated with each parallel current branches for providing a perceivable indication that charge current is passing through each branch and charging cells 34 retained in each branch.

Module 32 includes input receiving means in the form of pin connection 42 which is connectable to coaxial plug 24 of converter 20 in order to provide direct current to module 32 to effect charging of cells 34. Current received by pin connection 42 is passed, in a manner hereinafter to be described, to cells 34 through electrical conduits 44, 46 and 47 connected to cells 34 to provide charging of cells 34 in the aforementioned current branches.

Referring now to FIG. 4, a schematic circuit diagram depicting the present invention is shown at 50. As mentioned earlier, AC to DC converters associated with many current using devices are adapted to provide outputs with relatively low voltages. In some instances, the low voltage supplied by the converter is insufficient to effect simultaneous charging of the cells 34 and energization of the current indicating means. By way of example, a converter may supply a line voltage of 3 volts. Since the typical voltage drop across two cells is 2.6 volts and the voltage necessary to energize a light emitting diode (hereinafter referred to as "LED") is 1.6 volts, it is readily apparent that the voltage supplied by the converter is insufficient where the cells and LED are in series. The present invention provides a solution to this problem by placing the LED electrically in parallel with the cells and by providing logic means for lighting the LED upon the passage of current through the cell.

As viewed in FIG. 4, input receiving means 42 is connected to electrical conductor 54 at ground potential and to electrical conductor 52 at an elevated potential. A first pair of current branches 60 and 62 are connected across lines 52 aand 54 in electrically parallel relationship with each other. Branches 60 and 62 each include a pair of rechargeable cells 34 electrically in series with a resistor R1 provided to limit the flow of current through the respective current branch.

A second pair of current branches 64 and 66 are connected across lines 52 and 54 electrically in parallel with each other and electrically parallel with branches 60 and 62. Branches 64 and 66 each contain electrically in series a current limiting resistor R2, current indicator means in the form of a LED 68 and a switch S1. Each switch S1 is adapted to operate in a first mode preventing the passage of current through its respective second current branch and in a second mode permitting the passage of current through its respective second current branch. In a manner hereinafter to be explained each switch is operable in the second mode in response to a first predetermined level of current in one of the first current branches. In other words each switch S1 is operable to prevent the passage of current through its respective current branch when the level of current in one of the first current branches is below a predetermined level and to permit the passage of current in its respective branch when the level of current is above the predetermined level.

Each switch S1 is adapted to be electrically connected to, and receive a signal from, voltage comparator means in the form of voltage comparator C1. The voltage comparator C1, connected to switch S1 in the second current branch 66, is electrically connected by line 70 to first current branch 62 at a point 72 intermediate cells 34 and resistor R1. Hence, line 70 provides a first voltage input to comparator C1 which is indicative of the voltage level and flow of current in current branch 62 at point 72. The voltage comparator C1, connected to switch S1 in the second current branch 64, is electrically connected by line 74 to first current branch 60 at a point 76 intermediate cells 34 and resistor R1. Hence, line 74 provides a first voltage input to comparator C1 which is indicative of the voltage level and flow of current in current branch 60 at point 76.

A third current branch 78, is disposed between lines 52 and 50, and contains voltage reducing means R3 and R4 connected in series. Electrical conduit line 80 connects point 82, disposed in the third current branch 78 intermediate resistors R3 and R4, with comparators C1 disposed in each pair of second current branches. Hence, line 80 provides a reference voltage, equal to the voltage at point 82 in the third current branch, as an input to each comparator C1.

Each comparator C1 is adapted to compare the reference voltage with the voltage input indicative of the level of voltage in the first current branch to which it is connected and, in the event of the occurrence of a predetermined difference between the voltages, is adapted to provide a signal to its respective switch S1 in response to the predetermined voltage difference which causes the switch S1 to close and become operable in the aforementioned second mode. The aforementioned voltage difference is selected such that it is indicative of a first predetermined level of current through the first current branch to which the comparator C1 is connected. When either switch is operative in the aforementioned second mode, current is passed through its respective second current branch and the LED 68 in that branch is energized thereby providing an indication of the passage of charge current through the cells disposed in the associated first current branch.

As stated earlier each comparator C1 is adapted to compare a reference voltage with a voltage indicative of a level of voltage in its respective first current branch. The reference voltage is selected such that whenever cells 34 are being charged by direct current received by input pin 42 from converter 20 the reference voltage is lower than the voltage at points 72 and 76. By way of example, the reference voltage is selected such that, when cells are positioned in first current branch 62 and charge current from converter 20 passing through first current branch 62, the reference voltage is less than the voltage at point 72 in first current branch 62. Under such conditions comparator C1 will provide a signal to switch S1 in second current branch 66, closing switch S1 and energizing LED 68 in second current branch 66. Similarly, by way of example, the reference voltage is selected such that, when cells are positioned in first current path 60 and charge current from converter 20 is passing through first current branch 60, the reference voltage is less than the voltage at point 76 in first current branch 60. Under such conditions, comparator C1 will provide a signal to switch S1 in second current branch 64 closing switch S1 and energizing LED 68 in second current branch 64.

When no current is passing through first current branch 62, such as when cells 34 are not installed properly or not at all in first current branch 62, the voltage at point 72 will be zero. Since the voltage at point 72 will be less than the reference voltage, switch S1 in second current branch 64 will be in the first mode and the LED 68 will not be energized. Hence, the user of module 32 will be aware that charge current is not passing through first current branch 62 and that the cells 34 are not installed in a manner which permits the passage of charging current.

The reference voltage must also be selected to insure that neither LED 68 is energized when the cells 34 installed in first circuit branch 62 are of a different state of charge and consequently a different voltage than the cells 34 installed in first circuit branch 60 and converter 20 is disconnected from input pin 42. As mentioned above, under this condition, the voltage difference of cells 34 with higher state of charge and the cells 34 with lower state of charge will cause circulation of current in the loop consisting of first current branch 60 and the first current branch 62. Under such conditions, a voltage will exist at both points 72 and 76. In order to prevent one of the LED's 68 from being energized under such conditions, the reference voltage is selected so as to be more positive than the voltage at points 72 and 76 under such conditions. The reference voltage may be so set by appropriate selection of resistors R3 and R4 which will establish a voltage at point 82 which is higher than the voltage at points 72 and 76 under the conditions just described but lower than the voltage at points 72 and 76 when charge current driven by converter 70 is passing through first current branches 60 and 62.

The present invention has been applied to a module 32 adapted to receive direct current from a converter at a voltage of approximately 3 volts and adapted to charge AA size nickel cadmium rechargeble batteries. In such applications it was found that incorporation in the circuit heretofore described of resistor R1 of 5.6 ohms, resistor R2 of 100 ohms, resistor R3 of 33,000 ohms, resistor R4 of 1800 ohms and a dual voltage comparator known in the semiconductor industry as LM 393 accomplished the purposes of objectives of the present invention. The aforementioned LM 393 component was particularly advantageous since both a comparing function and the switching function were accomplished by the component.

With circuit elements having the values set forth in the preceeding sentence and with the circuit connected to a direct current source of 3 volts and all cells at the same state of charge or voltage of 1.3 volts, the reference voltage at point 82 will be 0.155 volts while the voltage at points 72 and 76 will be 0.398 volts. Since the voltage at point 82 is less than the voltage at points 72 and 76, both switches S1 will be operable in the aforementioned second mode and both LED's 68 will be energized. With converter 20 disconnected from input receiving means 42 and with a set of cells 34 in first circuit branch 62 having a voltage of 2.8 volts and a set of cells 34 in first circuit branch 60 having a voltage of 2.6 volts, the voltage at point 82 will be 0.129 volts, the voltage at point 72 will be −0.100 volts and the voltage at point 76 will be 0.100 volts. Since the reference voltage is higher than the voltage at points 72 and 76 under these conditions, neither LED 68 will be energized and a false indication of charging will not be provided even though a current is circulating through branches 60 and 62.

While the preferred embodiment of the present invention has been described and depicted, it will be appreciated by those skilled in the art that modifications, substitutions and changes may be made thereto without departing from the scope of the invention as set forth in the appending claims. Therefore, what is desired to be secured by Letters Patent is as follows:

I claim:

1. An electrical circuit for charging a rechargeable cell comprising:
   current input receiving means adapted to be connected to an external source of direct current;
   a pair of first current branches, each branch in said pair adapted to receive at least one rechargeable cell and in electrically parallel relationship with the other branch in said pair;
   a pair of second current branches, one of said second branches in said pair disposed in electrically parallel relationship with one of said first branches and the other of said second branches disposed in electrically parallel relationship with the other first branch;
   a pair of charge current indicators, one of said indicators disposed in one of said second branches and the other of said indicators disposed in the other of said second branches and each of said charge current indicators adapted to provide an indication of the passage of a first predetermined level of charge current through one of said first current branches;
   a pair of switches, one of said switches disposed in one of said second current branches and the other of said switches disposed in the other of said second current branches, each of said switches operable in a first mode to prevent the flow of current through its respective second current branch and operable in a second mode to permit the flow of current through its respective second current branch, one of said pair of switches operable in said second mode in response to said first level of current through one of said first current branches and the other of said switches operable in said second mode in response to said first level of current through the other of said first current branches;
   means for comparing a first parameter in one of said first current branches with a reference parameter and providing a signal to one of said switches in response to a first predetermined difference between said parameters, said one of said switches operative in said second mode in response to said signal to permit the flow of current through its respective second current branch and permit one of said charge current indicators to provide an indication of the passage of charge current through said one of said first current branches, said first predetermined difference being selected so as to preclude said comparing means from providing said signal when said current input receiving means is disconnected from said external source of current and a circulating current is circulating in said circuit as a result of a difference in the state of charge of the rechargeable cell in one of said first current branches from the state of charge of the rechargeable cell in the other of said current branches.

2. The invention as set forth in claim 1 further comprising:
   a third current branch in parallel with said pair of second current branches, said third circuit branch adapted to provide said reference parameter.

3. The invention as set forth in claim 2 further comprising:
   a pair of resistors connected in series in said third current branch, wherein said reference parameter is a parameter disposed at a point in said third branch intermediate said resistors.

4. The invention as set forth in claim 1 further comprising:
   means for establishing a reference parameter;
   means for comparing said reference parameter with a first parameter indicative of the level of current in said one of said current branches and for providing a signal in response to said comparison of said parameters, said one of said switches operable in said second mode in response to said comparison, said reference parameter selected so as to preclude said switches from operating in said second mode when a circulating current is circulating in said circuit and said current input receiving means is disconnected from said external source.

5. The invention as set forth in claim 4 wherein said reference parameter establishing means establishes a reference voltage, said first parameter is a first voltage, said comparison is a voltage comparison and said reference voltage is selected so as to preclude said comparing means from providing said signal to said switch when a circulating current is circulating in said circuit and said current input receiving means is disconnected from said external source.

6. An electrical circuit for recharging a rechargable cell comprising:
   current input receiving means adapted to be connected to an external source of direct current;
   an electrical circuit having a pair of first current branches, each branch in said pair adapted to receive at least one rechargeable cell and in electrically parallel relationship with the other branch in said pair;
   indicator means electrically connected in said circuit for indicating the passage of charge current through at least one of said first current branches;
   means for preventing said indicating means from indicating the passage of charge current through said one current branch when said circuit is disconnected from said external source of current and a circulating current is circulating in said circuit as a result of a difference in the state of charge of the rechargeable cell in one of said first current branches from the state of charge of the rechargeable cell in the other of said current branches.

* * * * *